United States Patent Office 3,778,437
Patented Dec. 11, 1973

3,778,437
CHEMICAL COMPOUNDS AND COMPOSITIONS
Charles Brian Barlow, Camberley, and Clive Dudley Spencer Tomlin, Maidenhead, England, assignors to Imperial Chemical Industries Limited, London, England
No Drawing. Filed Aug. 20, 1971, Ser. No. 173,629
Claims priority, application Great Britain, Sept. 3, 1970, 42,222/70
Int. Cl. C07d 57/12
U.S. Cl. 260—256.4 N                    4 Claims

ABSTRACT OF THE DISCLOSURE

Compounds having the formula:

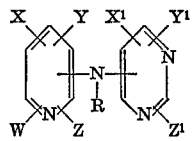

wherein R represents an atom of hydrogen, an unsubstituted or substituted hydrocarbon group or an acyl group; W, X, $X^1$, Y, $Y^1$, Z and $Z^1$ represent atoms of hydrogen or halogen, provided that at least four of W, X, $X^1$, Y, $Y^1$, Z and $Z^1$ are atoms of halogen. These compounds are useful for combatting pests.

---

This invention relates to new compounds, to processes for obtaining them, to compositions comprising them, and to methods of combating pests using them.

Accordingly this invention provides compounds having the formula:

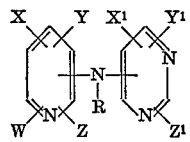

wherein R represents an atom of hydrogen, an unsubstituted or substituted hydrocarbon group or an acyl group; W, X, $X^1$, Y, $Y^1$, Z and $Z^1$ represent atoms of hydrogen or halogen provided that at least four of W, X, $X^1$, Y, $Y^1$, Z and $Z^1$ are atoms of halogen.

In a preferred aspect the invention provides compounds having the formula:

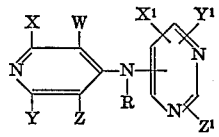

wherein R represents an atom of hydrogen, an unsubstituted or substituted hydrocarbon group or an acyl group; W, X, $X^1$, Y, $Y^1$, Z and $Z^1$ represent atoms of hydrogen or halogen provided that at least four of W, X, $X^1$, Y, $Y^1$, Z and $Z^1$ are atoms of halogen.

In a more preferred aspect the invention provides compounds having the formula:

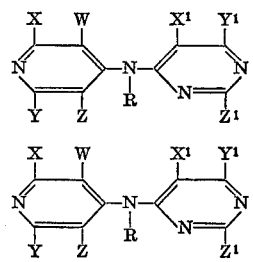

wherein R represents an atom of hydrogen, an unsubstituted or substituted hydrocarbon group or an acyl group; W, X, $X^1$, Y, $Y^1$, Z and $Z^1$ represent atoms of hydrogen or halogen, provided that at least four of W, X, $X^1$, Y, $Y^1$, Z and $Z^1$ are atoms of halogen.

In a yet more preferred aspect the invention provides compounds having the formula:

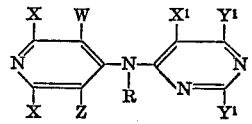

wherein R represents an atom of hydrogen, an alkyl group or an acyl group; and W, X, $X^1$, Y, $Y^1$, Z, $Z^1$ represent atoms of hydrogen, chlorine or fluorine, provided that at least four of W, X, $X^1$, Y, $Y^1$, Z and $Z^1$ are atoms of chlorine or fluorine.

In an even yet more preferred aspect the invention provides compounds having the formula:

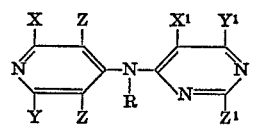

wherein W, X, $X^1$, Y, $Y^1$, Z and $Z^1$ represent atoms of fluorine or chlorine and R represents hydrogen.

Especially preferred compounds provided by the present invention are those wherein at least three of W, X, Y and Z are atoms of fluorine.

Particularly useful compounds according to the invention are the compounds whose formulae are given in Table I below, together with a melting point for each compound expressed in degrees centigrade.

TABLE 1

| Compound number | Structural formula | Melting point, °C. |
|---|---|---|
| 1 | F,Cl-pyridyl–NH–Cl,Cl-pyrimidyl (F,Cl) | 185.7–186.5 |
| 2 | F,F-pyridyl–NH–Cl-pyrimidyl (F,F) | 197–198 |
| 3 | Cl,Cl-pyridyl–N($C_2H_5$)–Cl-pyrimidyl (Cl,Cl) | 160.8 |
| 4 | F,F-pyridyl–NH–Cl-pyrimidyl (F,Cl) | 159.4–163.2 |
| 5 | Cl,Cl-pyridyl–NH–Cl-pyrimidyl (F,Cl) | 186.7–188.8 |
| 6 | Cl,Cl-pyridyl–NH–Cl-pyrimidyl (Cl,Cl) | 183–186 |

TABLE 1—Continued

| Compound number | Structural formula | Melting point, °C. |
|---|---|---|
| 7 | (structure) | 177.7–178.5. |
| 8 | (structure) | 190.8–191.6. |
| 9 | (structure) | 191.8–193.6. |
| 10 | (structure) | 151.9–153.1. |
| 11 | (structure) | 213.0–213.7. |
| 12 | (structure) | 175.2–175.7. |
| 13 | (structure) | Sublimes at 206–211. |
| 14 | (structure) | 173.8–174.4. |
| 15 and 16 | 1:1 mixture of (structure) and (structure) | 135–138 (mixture). |

The compounds of the present invention are conveniently prepared by the treatment of a compound having the formula:

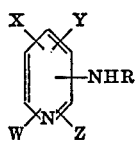

with a base, and then reacting the treated compound thus produced with a compound of the formula:

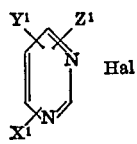

wherein W, X, $X^1$, Y, $Y^1$, Z and $Z^1$ have any of the meanings hereinbefore defined and Hal represents an atom of halogen. A suitable base for use in the above reaction is sodium hydride, and the process may be carried out in a diluent or solvent, for example dimethylformamide, or tetrahydrofuran.

The compounds of the invention may be used as pesticides either on their own or, preferably, incorporated in a composition comprising a diluent in addition to the invention compound.

The invention, therefore, provides pesticidal compositions, comprising as an active ingredient a compound having the formula:

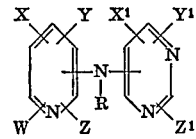

wherein R, W, X, $X^1$, Y, $Y^1$, Z and $Z^1$ have any of the meanings as hereinbefore defined.

In a preferred aspect the invention provides pesticidal compositions comprising as an active ingredient any of the compounds whose formulae are given in Table I hereinabove.

Compounds of the invention and compositions comprising them are very toxic towards insect and other invertebrate pests, including for example the following:

*Tetranychus telarius* (red spider mites)
*Aphis fabae* (black aphids)
*Megoura viciae* (green aphids)
*Aedes aegypti* (mosquitos)
*Musca domestica* (houseflies)
*Pieris brassicae* (cabbage white caterpillars)
*Plutella maculipennis* (diamond backed moth caterpillars)
*Phaedon cochleariae* (mustard beetles)
*Meloidogyne incognita* (nematodes)
*Agriolimax reticulatus* (grey field slugs)
*Calandra granaria* (grain weevils)

The compounds and compositions of the present invention are also toxic towards fungal pathogens of plants and seeds, including for example, the following:

*Puccinia recondita* (brown rust on wheat)
*Phytophthora infestans* (late blight on tomatoes)
*Plasmopara viticola* (downy mildew on vines)
*Uncinula necator* (powdery mildew on vines)
*Piricularia oryzae* (blast on rice)
*Podosphaera leucotricha* (powdery mildew on apples)

Certain of the compounds show algicidal properties.
Certain of the compounds are also herbicidal and are preferably used at higher rates for this purpose.

In use, the invention compounds, or compositions containing them, may be used to combat pests in a variety of ways. Thus the pests themselves, or the locus of the pests, or the pest habitat may be treated to control the pests. In a further feature therefore the invention provides a method of combating pests wherein the pests, the locus of the pests, or the habitat of the pests is treated with a compound or a composition according to the invention.

The invention also provides a method of treating plants with a compound or composition according to the invention to render them less susceptible to damage by pests, which may already be occurring (i.e. treatment to eradicate an infestation or infection) or which are expected to occur (i.e. treatment to protect the plant from an infestation or infection.)

In a yet further feature, therefore, the invention provides a method of treating plants to render them less susceptible to damage by pests, which comprises treating the plants, or the seeds, corms, bulbs, tubers, rhizomes or other propagative parts of the plants, with a compound or composition according to the invention.

If desired the medium in which the plants are growing may be similarly treated with a compound or composition according to the invention.

In another feature, therefore the invention provides a method of treating a medium in which plants are growing or to be grown which comprises applying to the medium a compound or composition according to the invention.

The compounds and compositions of the invention may be used for agricultural or horicultural purposes and the compound or type of composition used in any instance will depend upon the particular purpose for which it is to be used.

Compositions comprising the invention compounds may be in the form of dusting powders or granules wherein the active ingredient is mixed with a solid diluent or carrier. Suitable solid diluents or carriers may be, for example kaolinite (china clay), montmorillonite, attapulgite, talc, pumice, silica, calcium carbonate, gypsum, powdered magnesia, fuller's earth, Hewitt's earth and diatomaceous earth. Compositions for dressing seeds, for example, may comprise an agent assisting the adhesion of the composition to the seed, for example, a mineral oil.

The composition may also be in the form of dispersible powders or grains comprising, in addition to the active ingredient a wetting agent to facilitate the dispersion of the powder or grains in liquids. Such powders or grains may include fillers, suspending agents and the like.

The compositions may also be in the form of liquid preparations to be used as dips or sprays which are generally aqueous dispersions or emulsions containing the active ingredient in the presence of one or more wetting agents, dispersing agents, emulsifying agents or suspending agents.

Wetting agents, dispersing agents and emulsifying agents may be of the cationic, anionic, or non-ionic type. Suitable agents of the cationic type include, for example, quaternary ammonium compounds, for example cetyltrimethylammonium bromide. Suitable agents of the anionic type include, for example, soaps, salts of aliphatic monoesters of sulphuric acid, for example, soaps, salts of aliphatic monoesters of sulphuric acid, for example sodium lauryl sulphate, salts of sulphonated aromatic compounds, for example sodium dodecylbenzene sulphonate, sodium, calcium or ammonium lignosulphonate, butylnaphthalene sulphonate, and a mixture of the sodium salts of diisopropyl- and triisopropylnaphthalene sulphonic acids.

Suitable agents of the non-ionic type include, for example, the condensation products of ethylene oxide with fatty alcohols such as oleyl alcohol or cetyl alcohol, or with alkyl phenols such as octylphenol, nonylphenol and octylcresol. Other non-ionic agents are the partial esters derived from long chain fatty acids and hexitol anhydrides, the condensation products of the said partial esters with ethylene oxide, the lecithins, and block copolymers of ethylene oxide and propylene oxide.

Suitable suspending agents are, for example, bentonite, pyrogenic silica, and hydrophilic colloids, for example polyvinylpyrrolidone and sodium carboxymethyl-cellulose, and the vegetable gums, for example gum acacia and gum tragacanth.

The aqueous solutions, dispersions or emulsions may be prepared by dissolving the active ingredient or ingredients in an organic solvent which may contain one or more wetting, dispersing or emulsifying agents and then adding the mixture so obtained to water which may likewise contain one or more wetting, dispersing or emulsifying agents. Suitable organic solvents are ethylene dichloride, isopropyl alcohol, propylene glycol, diacetone alcohol, toluene kerosene, methyl-naphthalene, xylenes and trichloroethylene.

The compounds of the invention may also be formulated into compositions comprising capsules or microcapsules containing either the active ingredient itself, or a composition containing the active ingredient, and prepared by any of the known encapsulation or microencapsulation techniques.

The compositions to be used as sprays may also be in the form of aerosols wherein the formulation is held in a container under pressure in the presence of a propellant such as fluorotrichloromethane or dichlorodifluoromethane.

By the inclusion of suitable additives, for example, for improving the distribution, adhesive power and resistance to rain on treated surfaces, the different compositions can be better adapted for the various uses for which they are intended.

The compounds of this invention may also be conveniently formulated by admixing them with fertilizers. A preferred composition of this type comprises granules of fertilizer material incorporating, for example coated with, a compound of the invention. The fertilizer material may, for example, comprise nitrogen or phosphate-containing substances.

In yet a further aspect of the invention, therefore, we provide a pesticidal composition comprising as an active ingredient a compound of the invention in admixture with a fertilizer material.

The compositions which are to be used in the form of aqueous dispersions or emulsions are generally supplied in the form of concentrate containing a high proportion of the active ingredient or ingredients, the said concentrate to be diluted with water before use.

These concentrates are often required to withstand storage for prolonged periods and after such storage, to be capable of dilution with water in order to form aqueous preparations which remain homogeneous for a sufficient time to enable them to be applied by conventional spray equipment. The concentrates may conveniently contain from 10 to 85% by weight of the active ingredient or ingredients and generally from 25–60% by weight of the active ingredient or ingredients. When diluted to form aqueous preparations, such preparations may contain varying amounts of the active ingredient or ingredients depending upon the purpose for which they are to be used, but an aqueous preparation containing between 0.0001% and 1.0% by weight of the active ingredient or ingredients may be used.

It is to be understood that the pesticidal compositions of this invention may comprise, in addition to a compound of the invention, one or more other compounds having biological activity.

The invention is illustrated, but not limited, by the following examples.

EXAMPLE 1

This example illustrates the preparation of 4(2,6-dichoropyrimidin - 4 - ylamino)3,5 - dichloro-2,6-difluoropyridine (compound No. 1, Table 1), having the formula:

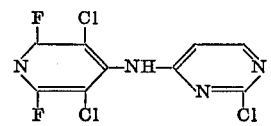

To a stirred suspension of sodium hydride (1.2 g.) in dry tetrahydrofuran (20 cc.) under a nitrogen atmosphere, a solution of 4-amino-3,5-dichloro-2,6-difluoropyridine (4.98 g.) in dry tetrahydrofuran (20 cc.) was added slowly, the mixture temperature being maintained in the range 7 to 10° C. by external cooling. When the addition was complete and evolution of hydrogen had ceased a solution of 2,4,6-trichloropyrimidine (4.6 g.) in dry tetrahydrofuran (20 cc.) was slowly added, the temperature again being maintained in the range 7 to 10° C. When this addition was complete the mixture was allowed to warm to 18° C. and stirring was continued for 18 hours, after which the mixture was poured onto ice and acidified with a little hydrochloric acid. The white precipitate thus produced was collected by extracting the mixture with ether and, after drying the extracts over anhydrous sodium sulphate, evaporating the ether. The residual solid was recrystallised from a mixture of cyclohexane and carbon tetrachloride to yield 4(2,6-dichloropyrimidin-4-ylamino)

3,5-dichloro-2,6-difluoropyridine, having a melting point of 185.7 to 186.5° C.

EXAMPLE 2

By a procedure similar to that illustrated in Example 1 above, but using the appropriate reactants, and dry dimethylformamide as solvent, the compounds named immediately below, were also prepared.

4(2,6-dichloropyrimidin-4-ylamino)2,3,5,6-tetrafluoropyridine (Compound No. 2 Table 1)
4(N-ethyl-N-2,6-dichloropyrimidin-4-ylamino)2,3,5,6-tetrachloropyridine (Compound No. 3 Table 1)
4(2,6-dichloropyrimidin-4-ylamino)2-chloro-3,5,6-trifluoropyridine (Compound No. 4 Table 1)
4(2,6-dichloropyrimidin-4-ylamino)2-fluoro-3,5,6-trichloropyridine (Compound No. 5 Table 1)
4(2,6-dichloropyrimidin-4-ylamino)2,3,5,6-tetrachloropyridine (Compound No. 6 Table 1)
4(4,6-dichloropyrimidin-2-ylamino 2,6-difluoro-3,5-dichloropyridine (Compound No. 7 Table 1)
4(4,6-dichloropyrimidin-2-ylamino)2,3,5,6-tetrafluoropyridine (Compound No. 8 Table 1)
4(2-pyrimidinylamino 2,3,6-trifluoro-5-chloropyridine (Compound No. 9 Table 1)
4(2,4,5-trichloropyrimidin-6-ylamino) 2,6-difluoro-3,5-dichloropyridine (Compound No. 10 Table 1)
4(4,6-dichloropyrimidin-2-ylamino)2,3,5,6-tetrachloropyridine (Compound No. 11 Table 1)
4(4,6-dichloropyrimidin-2-ylamino)2,3,6-trifluoro-5-chloropyridine (Compound No. 12 Table 1)
4(4,6-dichloropyrimidin-5-ylamino) 2,6-difluoro-3,5-dichloropyridine (Compound No. 13 Table 1)
4(4,6-dichloropyrimidin-2-ylamino)2-fluoro-3,5,6-trichloropyridine (Compound No. 14 Table 1)
4(4,6-difluoropyrimidin-2,6-difluoro-3,5-dichloropyridine and 4(2,6-difluoropyrimidin-4-yl) 2,6-difluoro-3,5-dichloropyridine (Compounds Nos. 15 and 16 Table 1) as a 1:1 mixture.

EXAMPLE 3

The activity of a number of the compounds was tested against a variety of insect and other invertibrate pests. The compounds were used in the form of a liquid preparation containing 0.1% by weight of the compound except in the tests with *Aedes aegypti* and *Meloidogyne incognita* where the preparations contained 0.1% by weight of the compound. The preparations were made by dissolving each of the compounds in a mixture of solvents consisting of 4 parts by volume of acetone and 1 part by volume of diacetone alcohol. The solutions were then diluted with water containing 0.01% by weight of a wetting agent sold under the trade name "Lissapol" NX until the liquid preparations contained the required concentration of the compound. "Lissapol" is a registered trademark.

The test procedure adopted with regard to each pest was basically the same and comprised supporting a number of the pests on a medium which was usually a host plant or a foodstuff on which the pests feed, and treating either or both the pests and the medium with the preparations.

The mortality of the pests was then assessed at periods usually varying from one to three days after the treatment.

The results of the tests are given below in Table 2. In this table the first column indicates the name of the pest species. Each of the subsequent columns indicates the host plant or medium on which it was supported, the number of days which were allowed to elapse after the treatment before assessing the mortality of the pests, and the results obtained for each of the compounds, numbered as in Table 1 above.

The assessment is expressed in integers which range from 0–3

0 represents less than 30% kill
1 represents 30–49% kill
2 represents 50–90% kill
3 represents over 90% kill
A indicates an antifeeding effect
C indicates a chemosterilant effect A dash (—) in Table 2 indicates that no test was carried out.

TABLE 2

| Pest species | Support medium | No. of days | 1 | 2 | 3 | 4 | 5 | 6 | 7 | 8 | 9 | 10 | 11 | 12 | 13 | 14 | 15 and 16 |
|---|---|---|---|---|---|---|---|---|---|---|---|---|---|---|---|---|---|
| *Tetranychus telarius* (red spider mites, adults) | French bean |  | 3 | 3 | 1 (C) | 3 | 3 | 0 | 3 (C) | 0 | 0 | 3 | 1 | 2 | 0 | 3 | 3 |
| *Tetranychus telarius* (red spider mites, eggs) | do | 3 | 0 | 3 | 0 | 3 | 0 | 0 | 0 | 0 | 0 | 3 | 0 | 0 | 0 | — | 0 |
| *Aphis fabae* (green aphids) | Broad bean | 2 | 0 | 3 | 0 | 3 | 1 | 0 | 0 | 0 | 0 | 0 | 0 | 0 | 0 | — | 0 |
| *Megoura viceae* (black aphids) | do | 2 | 0 | 2 | 0 | 2 | 0 | 0 | 0 | 0 | 0 | 3 | 0 | 0 | 0 | — | 0 |
| *Aedes aegypti* (mosquito larvae) | Water | 1 | 1 | 0 | 0 | 0 | 0 | 0 | 0 | 0 | 0 | 0 | 0 | 0 | 0 | 0 | 0 |
| *Musca domestica* (houseflies—contact test [1]) | Milk/sugar | 1 | 0 | 0 | 0 | 0 | 0 | 0 | 0 | 2 | 0 | 1 | 1 | 2 | 0 |  | 0 |
| *Musca domestica* (houseflies—residual test [1]) | Plywood | 1 | 0 | 0 | 0 | 0 | 1 | 0 | 0 | 0 | 0 | 0 | 0 | 0 | 0 |  | 0 |
| *Pieris brassicae* (cabbage white caterpillars) | Cabbage | 2 | 0 | 0 | 0 | 2 (A) | 0 | 0 | 0 | 0 | 0 | 0 (A) | 0 | 0 | 0 | 0 |  |
| *Plutella maculipennis* (diamond back moth, larvae) | Mustard/paper | 0 | 0 | 0 | 0 | 2 (A) | 0 (A) | 0 | 0 (A) | 0 | 0 | 0 | 0 | 0 | 0 | 0 | 0 |
| *Phaedon cochleariae* (mustard beetles) | do | 2 | 0 (A) | 0 | 0 | 0 | 0 | 0 | 0 | 0 | 3 | 0 | 0 | 0 | 0 |  | 0 |
| *Meloidogyne incognita* (nematodes) | Water | 1 | — | 0 | — | — | — | 3 | 3 | — | 3 | 0 | 0 | — |  |  | — |

[1] In the contact test the flies are sprayed directly: in the residual test the flies are placed on a medium that had previously been treated.

Compounds Nos. 1, 5 and 10 gave rise to abnormal growth effects in larvae of mosquitos (*Aedes aegypti*).

EXAMPLE 4

Compounds of the invention were tested for molluscicidal activity and details of the tests conducted are as follows.

A weighed sample of the compound under test was dissolved in 0.5 cc. of an ethanol and acetone mixture (50:50 v./v.). The solution was diluted with 0.5 cc. water and poured on to a calf feeding pellet in a glass petri dish and the pellet was air dried for 24 hours. The weight of compound used was chosen so that the dried pellet contained 4% by weight of the active ingredient. Two replicates each consisting of a plastic petri dish containing a pellet, 2 slugs, and a moistened filter paper to maintain a high relative humidity were used in each test. The dishes were left in the cold room (10° C.). After 6 days the kill was assessed.

The slugs used were *Agriolimax reticulatus* (Mull), and they had been starved for 24 hours before the commencement of the tests.

Compound No. 4 (Table 1) killed 50% of the slugs in this test.

EXAMPLE 5

The compounds of this invention were tested against a variety of foliar fungal diseases of plants. The technique employed is to spray the foliage of the undiseased plants with a solution of the test compound and also to drench the soil in which the plants are growing with another solution of the same test compound. All solutions for spraying and drenching contained 50, 100, or 200 p.p.m. (by weight) of the test compound. The plants were then infected with the diseases it was desired to control and after a period of days, depending upon the particular disease, the extent of the disease was visually assessed. The results are given in Table 3a below, wherein the extent of the disease is given in the form of a grading as follows:

| Grading: | Percentage amount of disease |
|---|---|
| 0 | 61 to 100 |
| 1 | 26 to 60 |
| 2 | 6 to 25 |
| 3 | 0 to 5 |

(P indicates that the host plant showed phytotoxic damage). In Table 3 the disease is given in the first column, and in the second column is given the time which elapsed between infecting the plants and assessing the amount of disease.

TABLE 3

| Disease and plant | Time interval (days) | Disease code letter (Table 3A) |
|---|---|---|
| Puccinia recondita (wheat) | 10 | A |
| Phytophthora infestans (tomato) | 3 | B |
| Podosphaera leucotricha (apple) | 10 | C |
| Uncinula necator (vine) | 10 | D |
| Plasmopara viticola (vine) | 7 | E |
| Piricutaria oryzae (rice) | 7 | F |
| Botrytis cinerea (tobacco) | 3 | G |

TABLE 3A

| No. of compound (Table 1) | Concentration of compound (p.p.m.) | Disease code letter (Table 3) | | | | | | |
|---|---|---|---|---|---|---|---|---|
| | | A | B | C | D | E | F | G |
| 1 | a 50 | 2 | P | — | P | 3 | P | P |
| 3 | 50 | 0 | 0 | 0-2 | 0 | 0 | 0 | — |
| 4 | 50 | 0 | P | 3(P) | P | 2-3 | 0 | — |
| 5 | 50 | 0 | P | — | 3 | 2-3 | 0 | — |
| 6 | a 50 | 0 | 3 | 0 | 2 | 3 | P | 3 |
| 7 | 100 | 0 | — | 0-1 | — | 3 | 2 | 0 |
| 8 | 100 | 0 | — | 0-2 | — | 3 | 0-1 | 0 |
| 9 | 100 | 1 | — | 0-2 | — | 0 | 1 | 0 |
| 11 | 100 | 0 | 0 | 0 | 0 | 0 | 2 | 0 |
| 12 | 100 | 0-1 | 2 | 0 | 0-3 | 3 | 1 | 0 |
| 14 | 100 | 2 | — | 0-2 | — | 3 | 0 | 0-1 | a 200 p.p.m. for *Phytophthora infestans* soil drench solution.

EXAMPLE 6

This example illustrates the herbicidal properties of the compounds of the present invention. The compounds were ball-milled in water containing a surface-active agent sold under the name of Lissapol and comprising a condensate of p-nonylphenol with seven to eight molar proportions of ethylene oxide. The ball-milled material was diluted with water to give a spray composition containing 0.1% of the surface active agent, and sprayed on to young pot plants of the species listed in Table 4 below (Post-emergence test). The rate of application of the active ingredient was equivalent to 10 pounds per acre and the spray volume 100 gallons per acre. Damage to the plants was assessed on a scale of 0–3 where 0 represents no effect and 3 represents complete kill. In the same experiment pots of soil were sown with seeds of the plant species listed in Table 2 and then sprayed with the above spray composition at the rate of 10 pounds per acre of active ingredient (Pre-emergence test). The results are given in Table 4 below.

TABLE 4

| No. of compound (Table 1) | Pre-emergence | | | |
|---|---|---|---|---|
| | Lettuce | Tomato | Wheat | Maize |
| 1 | 3 | 3 | 1 | 1 |
| 2 | 3 | 2 | 2 | 0 |
| 4 | 3 | 1 | 0 | 0 |
| 6 | 3 | 2 | 2 | 0 |
| 12 | 3 | 2 | 2 | 0 |
| 15 and 16 | 3 | 0 | 0 | 0 |

| | Post-emergence | | | |
|---|---|---|---|---|
| 1 | 3 | 3 | 0 | 0 |
| 2 | 3 | 3 | 2 | 0 |
| 4 | 3 | 3 | 0 | 0 |
| 6 | 0 | 0 | 0 | 0 |
| 12 | 2 | 1 | 0 | 0 |
| 15 and 16 | 3 | 3 | 0 | 0 |

These results demonstrate that the compounds of this invention have herbicidal properties, and also that some compounds have particularly useful selective herbicidal activity against broad-leaved plants.

In a further test compounds 2, 4 and 10 were tested 5.0 pounds/acre against several plant species. Both a pre-emergent and post-emergent test was carried out. The results are given on a scale 0 to 5 in the following table where 0 represents no effect and 5 represents complete kill.

| Compound No. (Table 1) | Test plant | | | | | | | | Type of test |
|---|---|---|---|---|---|---|---|---|---|
| | Sb | Ka | Ca | Pea | On | Bar | Ri | Oat | |
| 2 | 0 | 0 | 0 | 0 | 0 | 0 | 0 | 0 | Preemergent test. |
| 4 | 3 | 2 | 2 | 0 | — | 0 | 0 | 0 | |
| 10 | 4 | 4 | 5 | 0 | 5 | 0 | 4 | 1 | |
| 2 | 0 | 1 | 0 | 0 | 3 | 0 | 0 | 0 | Postemergent test. |
| 4 | 0 | 0 | 1 | 0 | 0 | 0 | 0 | 0 | |
| 10 | 1 | 4 | 5 | 0 | 2 | 1 | 0 | 0 | |

The abbreviations used in the above table have the following meanings.

| Abbreviation: | Plant |
|---|---|
| Sb | Sugar Beet. |
| Ka | Kale. |
| Ca | Cabbage. |
| On | Onion. |
| Bar | Barley. |
| Ri | Rice. |

The following examples illustrate pesticidal compositions according to the invention.

EXAMPLE 7

This example illustrates a concentrate comprising a miscible oil which is readily convertible by dilution with water into a liquid preparation suitable for spraying purposes.

The concentrate has the following compositions:

| | Percent wt. |
|---|---|
| Compound No. 1 of Table 1 | 25.0 |
| "Lubrol" L (alkylphenol/ethylene oxide condensate; "Lubrol" is a trademark) | 2.5 |
| Calcium dodecylbenzenesulphonate | 2.5 |
| "Aromasol" H (alkylbenzene solvent; "Aromasol" is a trademark) | 70.0 |
| | 100.0 |

EXAMPLE 8

This example also illustrates a powder. The composition is as follows:

| | Percent wt. |
|---|---|
| Compound No. 2 of Table 1 | 25.0 |
| Sodium silicate | 5.0 |
| Calcium lignosulphonate | 5.0 |
| China clay | 65.0 |
| | 100.0 |

EXAMPLE 9

This example illustrates an atomisable fluid comprising a mixture consisting of 25% by weight of the compound No. 4 of Table 1 and 75% by weight of xylene.

EXAMPLE 10

This example illustrates a dusting powder which may be applied directly to plants or other surfaces and comprises 1% by weight of Compound No. 5 of Table 1 and 99% by weight of talc.

EXAMPLE 11

25 parts by weight of compound No. 10 of Table 1, 65 parts by weight of xylene, and 10 parts of an alkyl aryl polyether alcohol "Triton" X–100 ("Triton" is a trademark) were mixed. There was thus obtained an emulsion concentrate which can be mixed with water to produce an emulsion suitable for use in agricultural applications.

EXAMPLE 12

5 parts by weight of compound No. 7 of Table 1 were thoroughly mixed in a suitable mixer with 95 parts by weight of talc. There was thus obtained a dusting powder.

EXAMPLE 13

10 parts by weight of compound No. 1 of Table 1, 10 parts of an ethylene oxide-octylphenol condensate ("Lissapol" NX; "Lissapol" is a trademark) and 80 parts by weight of diacetone alcohol were thoroughly mixed. There was thus obtained a concentrate which, on mixing with water, gave an aqueous dispersion suitable for application as a spray in the control of insect pests.

EXAMPLE 14

This example illustrates a concentrated liquid formulation in the form of an emulsion. The ingredients listed below were mixed together in the stated proportions and the whole stirred until the constituents were dissolved.

| | Percent wt. |
|---|---|
| Compound No. 1 of Table 1 | 20 |
| "Lubrol" L ("Lubrol" is a trademark) | 17 |
| Calcium dodecylbenzenesulphonate | 3 |
| Ethylene dichloride | 45 |
| "Aromasol" H ("Aromasol" is a trademark) | 15 |
| | 100 |

EXAMPLE 15

The ingredients listed below were ground together in the proportions stated to produce a powdered mixture readily dispersible in liquids.

| | Percent wt. |
|---|---|
| Compound No. 10 of Table 1 | 50 |
| Dispersol T | 5 |
| China clay | 45 |
| | 100 |

EXAMPLE 16

A composition in the form of grain readily dispersible in a liquid (for example water) was prepared by grinding together the first four of the ingredients listed below in the presence of water and then the sodium acetate was mixed in. The admixture was dried and passed through a British Standard mesh sieve, size 44–100 to obtain the desired size of grains.

| | Percent wt. |
|---|---|
| Compound No. 2 of Table 1 | 50 |
| Dispersol T | 12.5 |
| Goulac | 5 |
| Calcium dodecylbenzenesulphonate | 12.5 |
| Sodium acetate | 20 |
| | 100 |

EXAMPLE 17

A composition suitable for use as a seed dressing was prepared by mixing all three of the ingredients set out below in the proportions stated.

| | Percent wt. |
|---|---|
| Compound No. 1 of Table 1 | 80 |
| Mineral oil | 2 |
| China clay | 18 |
| | 100 |

EXAMPLE 18

A composition suitable for use as a seed dressing was prepared by mixing all three of the ingredients set out below in the proportions stated.

| | Percent wt. |
|---|---|
| Compound No. 4 of Table 1 | 80 |
| Mineral oil | 2 |
| China clay | 18 |
| | 100 |

EXAMPLE 19

A granular composition was prepared by dissolving the active ingredient in a solvent, spraying the solution obtained on to granules of pumice and allowing the solvent to evaporate.

| | Percent wt. |
|---|---|
| Compound No. 2 of Table 1 | 5 |
| Pumice granules | 95 |
| | 100 |

EXAMPLE 20

An aqueous dispersion formulation was prepared by mixing and grinding the ingredients recited below in the proportions stated.

| | Percent wt. |
|---|---|
| Compound No. 3 of Table 1 | 40 |
| Calcium lignosulphonate | 10 |
| Water | 50 |
| | 100 |

The following constitutes an explanation of the compositions or substances represented by the various trademarks and trade names referred to in the foregoing examples.

"Lubrol" L is a condensate of 1 mole of nonyl phenol with 13 molar proportions of ethylene oxide "Aromasol" H is a solvent mixture of alkylbenzenes "Dispersol" T is a mixture of sodium sulphate and a condensate of formaldehyde with the sodium salt of naphthalene sulphonic acid "Lissapol" NX is a condensate of 1 mol of nonyl phenol with 8 moles of ethylene oxide.

We claim:

1. A compound having the formula:

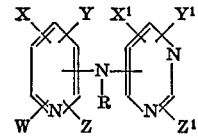

wherein R represents hydrogen or methyl; W, X, $X^1$, Y, $Y^1$, Z and $Z^1$ represent hydrogen, chlorine or fluorine, provided that at least four of W, X, $X^1$, Y, $Y^1$, Z and $Z^1$ are chlorine or fluorine.

2. A compound according to claim 1 and having the formula:

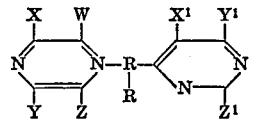

wherein R represents hydrogen or methyl; and W, X, $X^1$, Y, $Y^1$, Z and $Z^1$ represent hydrogen, chlorine or fluorine, provided that at least four of W, X, $X^1$, Y, $Y^1$, Z and $Z^1$ are chlorine or fluorine.

3. A compound according to claim 1 and having the formula:

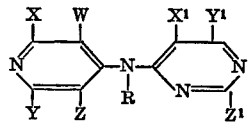

wherein R is hydrogen or methyl and W, X, $X^1$, Y, $Y^1$, Z and $Z^1$ represent fluorine or chlorine.

4. A compound as claimed in claim 1 wherein at least three of W, X, Y and Z are fluorine.

References Cited

UNITED STATES PATENTS

| 3,234,229 | 2/1966 | Redemann | 260—256.4 N |
| 3,499,898 | 3/1970 | von Bebenburg et al. | 260—256.4 N |

FOREIGN PATENTS

| 1,600,587 | 9/1970 | France | 260—256.4 |

RICHARD J. GALLAGHER, Primary Examiner

U.S. Cl. X.R.

71—3, 67; 424—251

UNITED STATES PATENT OFFICE
CERTIFICATE OF CORRECTION

Patent No. 3,778,437                Dated December 11, 1973

Inventor(s) Charles Brian Barlow et. al.

It is certified that error appears in the above-identified patent and that said Letters Patent are hereby corrected as shown below:

(2) Column 2, lines 46-50, the formula should read:

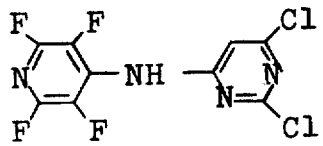

(3) Column 6, lines 51-56, the formula should read:

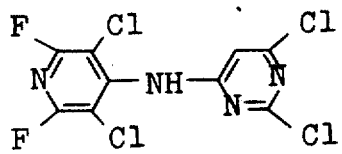

(4) Column 12, lines 66-71, the formula should read:

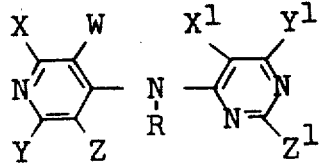

(5) Column 13, lines 4-9, the formula should be the same as in Claim 2, i.e. the bonds to $Y^1$ and $Z^1$ should come to the corners of the ring.

Signed and sealed this 23rd day of July 1974.

(SEAL)
Attest:

McCOY M. GIBSON, JR.
Attesting Officer

C. MARSHALL DANN
Commissioner of Patents